US010245768B2

(12) United States Patent
Bland (10) Patent No.: US 10,245,768 B2
(45) Date of Patent: Apr. 2, 2019

(54) DIE SLIDE ROTATIONAL HOLLOW MOLDING PROCESS AND ASSEMBLY FOR CREATING AN ARTICLE WITH A HOLLOW INTERIOR

(71) Applicant: U.S. Farathane Corporation, Auburn Hills, MI (US)

(72) Inventor: Wayne Bland, Fort Gratiot, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 606 days.

(21) Appl. No.: 14/879,902

(22) Filed: Oct. 9, 2015

(65) Prior Publication Data

US 2016/0101547 A1 Apr. 14, 2016

Related U.S. Application Data

(60) Provisional application No. 62/062,018, filed on Oct. 9, 2014.

(51) Int. Cl.
*B29C 45/04* (2006.01)
*B29C 45/14* (2006.01)
(Continued)

(52) U.S. Cl.
CPC ........ *B29C 45/14467* (2013.01); *B29C 44/08* (2013.01); *B29C 45/0062* (2013.01); *B32B 7/045* (2013.01); *B29C 2045/14524* (2013.01); *B29L 2031/7172* (2013.01); *B32B 1/02* (2013.01); *B32B 3/266* (2013.01); *B32B 3/28* (2013.01); *B32B 2250/02* (2013.01); *B32B 2250/24* (2013.01); *B32B 2439/00* (2013.01); (Continued)

(58) Field of Classification Search
CPC ............ B29C 45/0441; B29C 45/0416; B29C 45/14467; B29C 2045/14524
See application file for complete search history.

(56) References Cited

U.S. PATENT DOCUMENTS 3,070,843 A 1/1963 Jurgeleit
6,419,476 B1 7/2002 Ouellette
(Continued)

FOREIGN PATENT DOCUMENTS

EP 1060868 A1 * 12/2000 ......... B29C 45/0062
FR 2904255 A1 2/2008
(Continued)

*Primary Examiner* — Robert B Davis
(74) *Attorney, Agent, or Firm* — Dinsmore & Shohl LLP (57) ABSTRACT

A method for forming a component exhibiting a sealed interior, including providing first and second mold halves, foaming first and second half shells of material within cavities defined within each of the mold halves, and upon mating the mold halves together in a first closed mold configuration. The mold halves are reopened, with at least one of the shells being subsequently reoriented such that the first and second half shells are arrayed in opposing fashion with perimeter extending edges of each half shell arranged in contact with one another. Additional steps include reclosing the mold halves and subsequently forming a second perimeter extending material in contact with the contacting perimeter extending edges in order to bond the half shells together, upon which the mold halves are reopened and a completed component removed.

7 Claims, 8 Drawing Sheets (51) Int. Cl.
  *B32B 7/04* (2019.01)
  *B29C 45/00* (2006.01)
  *B29C 44/08* (2006.01)
  *B32B 1/02* (2006.01)
  *B32B 3/28* (2006.01)
  *B32B 3/26* (2006.01)
  *B29L 31/00* (2006.01)

(52) U.S. Cl.
  CPC ....... *B32B 2439/02* (2013.01); *B32B 2605/00* (2013.01)

(56) References Cited

U.S. PATENT DOCUMENTS

| | | | |
|---|---|---|---|
| 6,866,811 B2 | 3/2005 | Kayano et al. |
| 7,846,364 B2 | 12/2010 | Arai et al. |
| 7,875,224 B2 | 1/2011 | Gruber |
| 8,414,813 B2 | 4/2013 | Jung et al. |
| 2003/0175381 A1 | 9/2003 | Wohlrab |
| 2004/0094866 A1* | 5/2004 | Boucherie ........... B29C 45/0416 264/255 |
| 2008/0057242 A1 | 3/2008 | Wong et al. |
| 2008/0118686 A1 | 5/2008 | Glasgow et al. |
| 2008/0277839 A1 | 11/2008 | Smith |
| 2010/0084326 A1* | 4/2010 | Takesawa ........... B29C 45/0416 210/175 |
| 2013/0334733 A1* | 12/2013 | Bodet ................. B29C 45/0062 264/251 |
| 2014/0197574 A1 | 7/2014 | Anderson et al. |

FOREIGN PATENT DOCUMENTS

| | | | |
|---|---|---|---|
| JP | 2003276076 A | 9/2003 | |
| JP | 2010132548 A | 6/2010 | |
| WO | WO-2014065133 A1 * | 5/2014 | ....... B29C 45/14467 |
| WO | 2014111902 A2 | 7/2014 | |
| WO | WO-2015051271 A1 * | 4/2015 | ......... B29C 45/0062 |

* cited by examiner

DIE SLIDE ROTATIONAL HOLLOW MOLDING PROCESS AND ASSEMBLY FOR CREATING AN ARTICLE WITH A HOLLOW INTERIOR

CROSS-REFERENCE TO RELATED APPLICATIONS

This application claims the benefit of U.S. Provisional Application 62/062,018 filed on Oct. 9, 2014, the contents of which are incorporated herein in its entirety.

FIELD OF THE INVENTION

The present invention relates generally to a method and process for producing a thermoplastic and interiorly hollow sealed component, such as including but not limited to any of a number of vehicle related components such a gas tank vent, diesel fuel chamber vent, radiator pressure bottle, windshield solvent bottle, and the like. A two stage injection molding process is utilized in combination with first and second half molds respectively integrated into each of rotary die slide and pick-and-place platens in order to successively form the half shells, reorient in facing and perimeter edge defining fashion, and seal the shells together in water tight fashion through the application of an perimeter edge extending lip seal or gasket during the second injection molding operation.

BACKGROUND OF THE INVENTION

The prior art is documented with examples of existing hot plate, laser, or ultrasonic welding processes for producing an array of thermoplastic automotive related components. Among these are included such components as gas tank vents, diesel fuel chamber vents, radiator pressure bottles and windshield solvent bottles.

Wohlrab, US 2003/0175381, teaches a two plate closing unit of an injection molding machine including both stationary and movable mold mounting plates. Smith, US 2008/0277839, teaches a hollow structural part created in a co-injection molding system in a single forming operation.

Jung, U.S. Pat. No. 8,414,813, teaches a method and apparatus of making multi-component plastic molded parts including a pair of outer platens with first half-molds, and a middle platen with second half-molds interacting with the first half molds so as to define cavities in two parting planes of injection of a plastic melt. Of note, one of the first and second half-molds can move in increments relative to one another thereby forming different cavities in the parting planes from cycle to cycle.

Other prior art references of note include the process for simultaneous forming of at least two parts of thermoplastic material set forth in FR 2904255, and which includes providing tooling with two half shell molds superposed on each other and movable between closed and open positions. In one operational protocol, the molds are initially disposed in the ajar position, following which a predetermined amount of thermoplastic material is injected into the molds. The molds are subsequently closed to compress the material, forming the part, following which the molds are opened and the part removed.

SUMMARY OF THE INVENTION

The present invention discloses a method for forming a component exhibiting a sealed interior, the method including the steps of providing first and second mold halves, forming first and second half shells of material within cavities defined within each of the mold halves and upon mating the mold halves together in a first closed mold configuration, and opening and subsequently reorienting at least one of the shells or mold halves such that the first and second half shells are arrayed in opposing fashion with perimeter extending edges of each half shell arranged in contact with one another. Additional steps include reclosing the mold halves and subsequently forming a second perimeter extending material in contact with the contacting perimeter extending edges in order to bond the half shells together, upon which the mold halves are reopened and a completed component removed.

Other steps include rotating the first mold half upon a rotary die slide platen. Alternatively, a pick-and-place mechanism is employed for transferring the second half shell to a further cavity within said second mold half between prior to reclosing the mold halves and forming the perimeter extending material.

Additional steps include configuring multiple configurations within each of the mold halves, the multiple configurations including at least one cavity and one seating projection. The first and second material forming steps further include providing injection molding operations for introducing a thermoplastic material in flowable form between the mold halves. The step of configuring channels within and between the mold halves further being in order to deliver the thermoplastic material.

Yet additional steps include the step of forming the second perimeter extending material so as to exhibit an angled lip edge for bonding overlapping locations associated with the mating edges of the repositioned half shells. The step of forming the first and second half shells further includes forming the shells in first and second selected pairs of aligning cavity defining configurations established between the mold halves, while concurrently forming the perimeter extending material about a pair of previously formed and reoriented mold shells arranged with a third selected pair of aligning and cavity defining configuration.

An associated component produced by the present method is disclosed and includes first and second half shells, each being formed of a thermoplastic material in a first forming operation and each exhibiting a perimeter extending and mating lip edge. A second thermoplastic material is applied during a second forming operation about the mating lip edges in order to bond the half shells and to form the interior in a seal tight fashion.

At least one of the shells may further include an inner reinforcing rib structure or an extending conduit fitting structure. The second thermoplastic material may also exhibit, in cross section, a notched interior profile established by a pair of angled surfaces which seat over an outer edge of a first selected one of the mating lips and which likewise bond to a surface of the other selected one of the mating lips. A first selected of the perimeter extending and mating lip edges further includes a recess, the other selected lip edge exhibiting a projection which seats within the recess. The component may also include any of a gas tank vent, a diesel fuel chamber vent, a radiator pressure bottle or a windshield solvent bottle.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference now to FIGS. 1-15, the present inventions again disclose a method/process for producing a thermoplastic and interiorly hollow sealed component, as well as an associated component produced by such a process. An example of such a component is generally depicted at 2 in FIGS. 7-15 and can include, but is not limited to any of a number of vehicle or non-vehicle related components having a hollow interior, including without limitation such a gas tank vent, diesel fuel chamber vent, radiator pressure bottle, windshield solvent bottle, and the like.

As will be further described, the component 2 is constructed according to a two stage injection molding process, utilized in combination with first and second half molds respectively integrated into each of rotary die slide and pick-and-place platens in order to initially form first 4 and second 6 half shells (see in particular each of FIGS. 8-15) during a first shot injection molding process. Following this (and as will be further described with reference to FIGS. 1-7), the shells and their associated mold halves are reoriented in an opposing facing and perimeter edge defining fashion, at which point a second shot bonding strip of material (as shown at 8 in each of FIGS. 8-15) is injection molded to bond and seal the shells together in water tight fashion through the application of the perimeter edge extending lip seal or gasket during the second injection molding operation.

As will be further described, the present invention contemplates the creation of numerous differently configured parts, provided each initially created half shell exhibits a perimeter extending surface which mate upon being arrayed in opposing fashion and, prior to the second injection molded lip or flange being applied in order to bond the half shells together. The individual half shells may each include any unique shaping or profile, see for example inner reinforcing rib structure 5 associated with first shell 4 (exploded FIG. 9) as well as extending conduit fitting structure 7 associated with the second shell 6.

Figure 10:
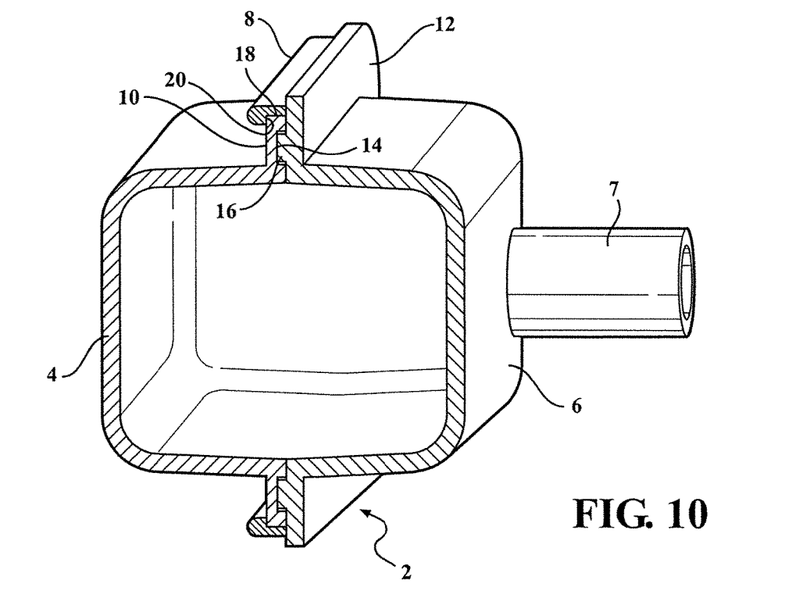
FIG. 10 is a rotated and cutaway view of the finished component of FIG. 8 and further illustrating one non-limiting example of a mating profile established between opposing perimeter lip edges associated with the individually formed mold halves/shells, in combination with the second injection shot molded perimeter seal for bonding the mating perimeter edges of the half shells.

The opposing perimeter mating surfaces, see at 10 for first shell 4 and at 12 for second shell 6, can further include opposing seating recesses (at 14 for lip 10 in FIG. 10) and projections (further shown as rectangular shaped projection 16 extending from lip 12 and as again best shown in the FIG. 10 cutaway). As previously described, the configuration of the hollow interior component 2 (shells 4 and 6) can vary according to the design details incorporated into the multiple pairs of mating cavities/projections depicted in FIGS. 1-7, the depiction of the component 2 in FIG. 7 et seq. being one representative and non-limiting example of the variety of shapes and configurations of the hollow interior articles which can be produced according to the present article and method.

As further depicted in the cutaway of FIG. 10, the second shot 8 includes a notched interior profile, see angled surfaces 18 and 20 which seat over an outer edge of the lip 10 and which likewise bond to an opposing surface of the lip 12 outward its projection 16. Without limitation, the second shot seal 8 can exhibit any desired profile or configuration which corresponds with the mating configuration of the opposing reoriented half shells 4 and 6.

Referring again to FIGS. 1-7, and initially to FIG. 1, a first exploded illustration is shown of a combination of rotary supported die slide (generally at 22) and pick-in-place (generally at 24) mold subassemblies, and which illustrates a first mating multi-cavity half mold configuration 26 associated with the stationary platen supported subassembly 24. As will be further described, the opposing half mold configurations can exhibit any desired shape and, in the illustrated, variant each mold configuration can include a number of subset mold defining recesses in order concurrently and successively form additional mold shells during the multi stage injection mold forming of each component 2.

Figure 1:
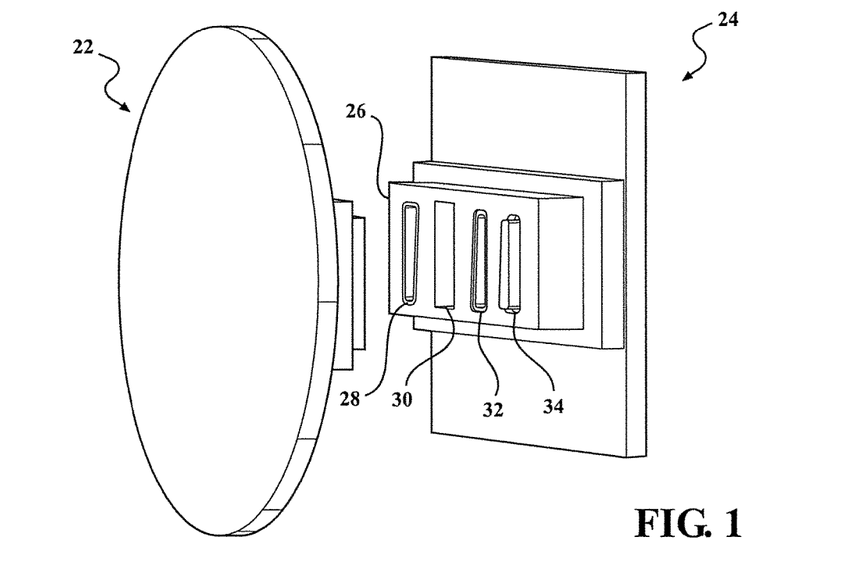
FIG. 1 is a first exploded illustration of a combination rotary supported die slide and pick-in-place mold subassemblies and illustrating a first mating multi-cavity half mold configuration associated with the stationary platen.

FIG. 1 illustrates a plurality of individual mold defining portions, including cavities 28, 30 and 32, and additional defined projection 34. These are each formed in an inner end face 27 of the mold half configuration 26 and are depicted in spaced apart fashion.

Figure 2:
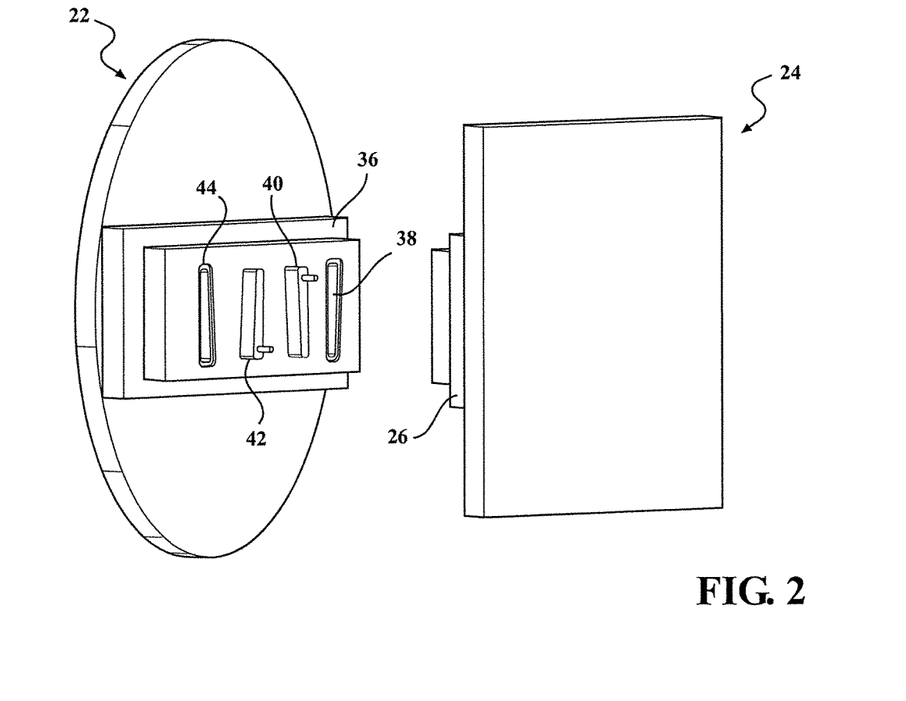
FIG. 2 is a rotated view of FIG. 1 and illustrating a second mating multi-cavity half mold configuration associated with the opposingly arrayed rotary supported platen.

FIG. 2 is a rotated view of FIG. 1 and illustrates a second mating multi-cavity half mold configuration 36 integrated into the rotary platen supported subassembly 22, this further including a further plurality of individual mold projections/profiles which include cavity 38, projections 40 and 42 and further cavity 44, all defined in an end face 37 of the configuration 36 in likewise spaced fashion as compared to the cavities 28, 30, 32 and projection 34 in the pick and place mold 24.

Upon orienting the molds 26 and 36 in an opposing and closing direction, the pluralities of mold defining cavities/seating projections 28-34 and 38-44 mate with one another in order to define a plurality of individual closed mold profiles according to desired configurations. As shown, this further includes additional outermost projecting details 41 and 43 (see again FIG. 2) associated with the individual part forming projections 40 and 42 associated with the rotary platen subassembly 22, this corresponding to feature 7 of shell 6 in the eventual part 2 of FIG. 8 et seq.

Figure 3:
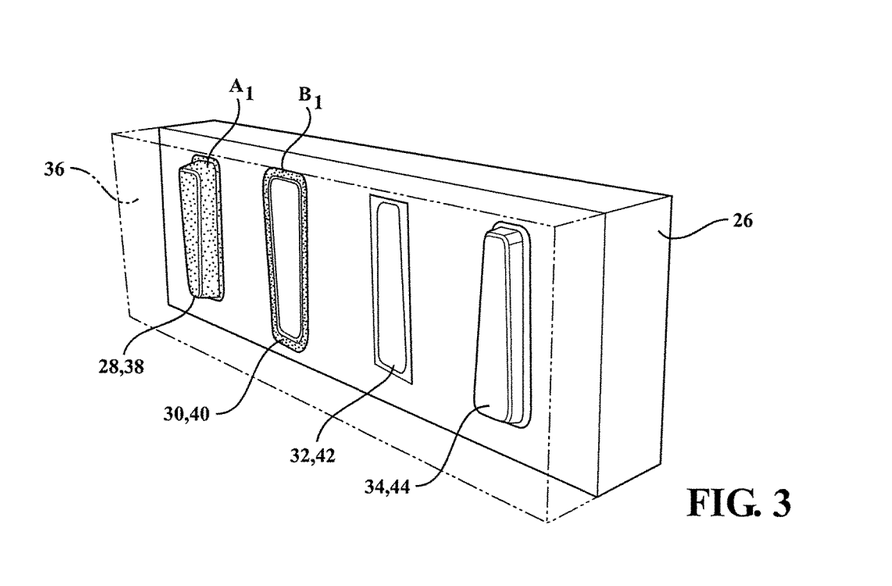
FIG. 3 illustrates a first closed molding configuration established between the mating halves in which a first injection molding operation injects a thermoplastic material into the assembled mold in order to create first A1 and second B1 part halves (or half shells) within selected cavities defined in the mold halves.

Proceeding to FIG. 3, illustrated is a first closed molding configuration established between the mating halves, shown in partial phantom again at 26 and 36 (the supporting rotary die slide 22 and pick-and-place 24 supporting bodies not being shown for purposes of ease of illustration), in which a first injection molding operation injects a thermoplastic material into the assembled mold (in particular opposing and inter-assembled/overlapping pairs of sealing cavities or portions shown at 28/38 and 38/40, this in order to create first A1 (corresponding to as previously shown at 4 for rotary platen 22) and second B1 (corresponding to as previously shown at 6 for stationary platen 24) part halves (also again termed as thermoplastic injection molded half shells) within the selected pairs of cavities defined in the mold halves. The terms "first" and "second" in reference to the mold formed portions or shells 6 and 8 are understood to refer to such shells or half portions produced within each of the stationary supported and rotary platen supported mold halves, with first and second being interchangeable in reference to the opposing mold halves. To this end, and although not shown, the figures contemplate the incorporation of a suitable network of channels for introducing the first shot of molten thermoplastic material from a reservoir location (not shown) to fill the defined mold interiors associated with the selected pairs of 28/38 and 30/40 of subset cavity defining portions.

Figure 4:
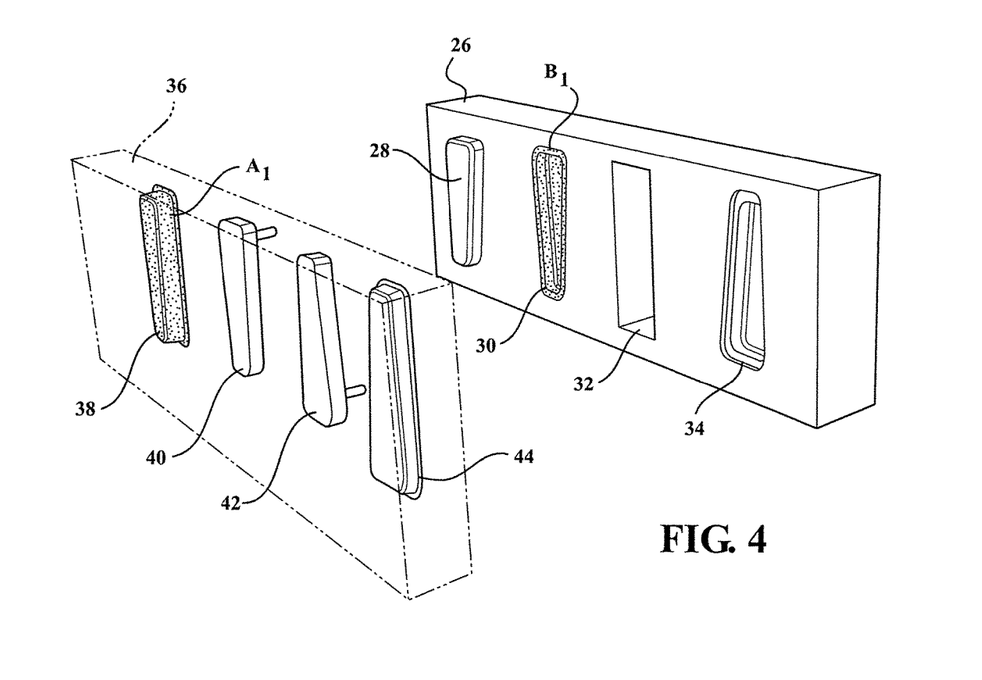
FIG. 4 succeeds FIG. 3 and illustrates an open mold configuration in which part halve A1 remains in its mold halve mounted to the moveable rotary platen, with part B1 remaining in its mold halve mounted to the stationary platen.
Figure 5:
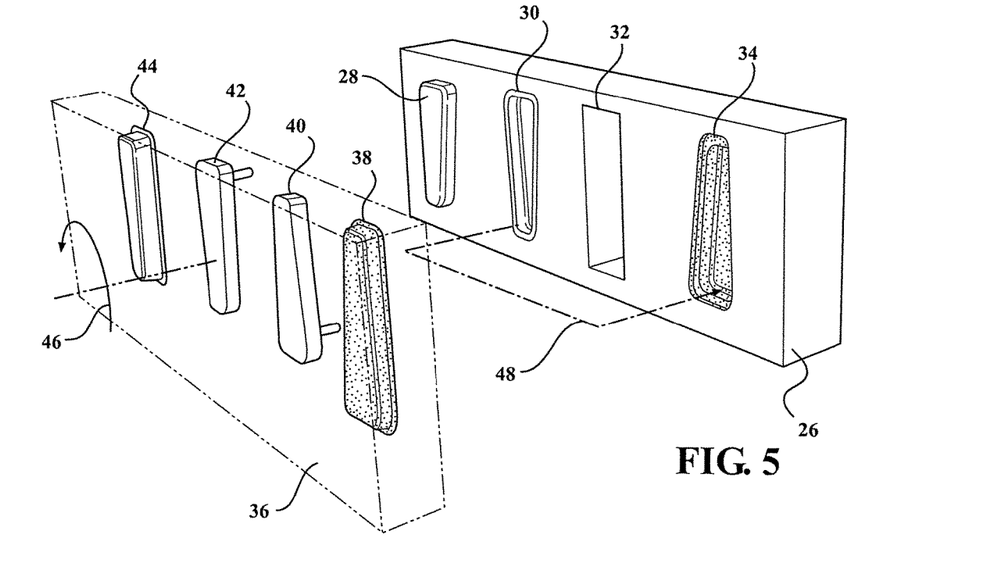
FIG. 5 is a further succeeding view in which the rotary platen supported mold half is rotated to a second seal shot location, a pick-and-place die slide being employed to move the part B1 from the initial cavity it was molded in to a further seal shot cavity located in the stationary supported mold halve.

FIG. 4 succeeds FIG. 3 and illustrates a successive open mold configuration in which part halve A1 remains in its mold halve 36 mounted to the moveable rotary platen 22, with part B1 remaining in its mold halve 26 mounted to the stationary platen 24. FIG. 5 is a further succeeding view in which the rotary platen supported mold half 36 is rotated (see arrow 46) to a second seal shot location, a pick-and-place die slide (not shown) is concurrently employed to move the part B1 (further linear directional arrow 48) from the initial projection 28 associated with the subdivided mold cavity defining pair 38/38 it was molded in to further seal shot cavity 34 located in the stationary platen supported mold halve 26, this upon 180° rotary repositioning of the platen 22 now opposing part A1 previously formed in cavity 38 of the rotary platen.

Figure 6:
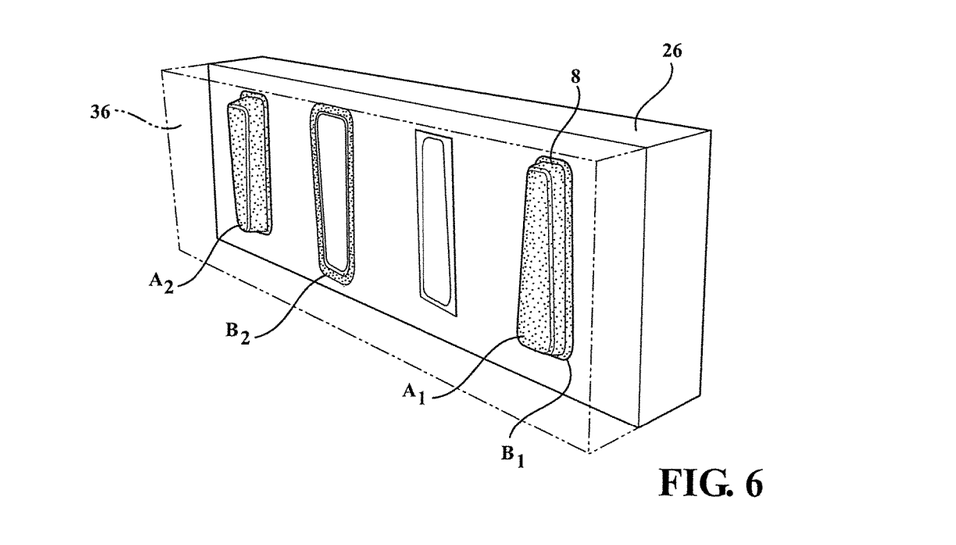
FIG. 6 is a successive illustration of a mold reclosing stage in which previously formed and repositioned parts A1 and B1 exhibit mating perimeter edge surfaces, at which point the second shot of thermoplastic material is injected to define a bonding and perimeter sealing gasket between the opposing arrayed mold halves in order to create a finished component, the initial injection molding process being repeated in order to form second mold halves or shells A2 and B2 as depicted in FIG. 3.

FIG. 6 is a successive illustration of a mold reclosing stage in which previously formed and repositioned parts A1 and B1 exhibit mating perimeter edge surfaces, at which point the second shot of thermoplastic material 8 is injected (again through an internal network of fluid communicating channels defined in the mold halves and which can be according to any known configuration) to define a bonding and perimeter sealing gasket between the opposing arrayed mold halves A1 (shell 4) and B1 (shell 6) in order to create a finished component, the initial injection molding process being repeated in order to form second mold halves or shells A2 (in cavity 44) and B2 (again in cavity defining projection 28) as previously depicted by shells A1 and B1 in FIG. 3.

Figure 7:
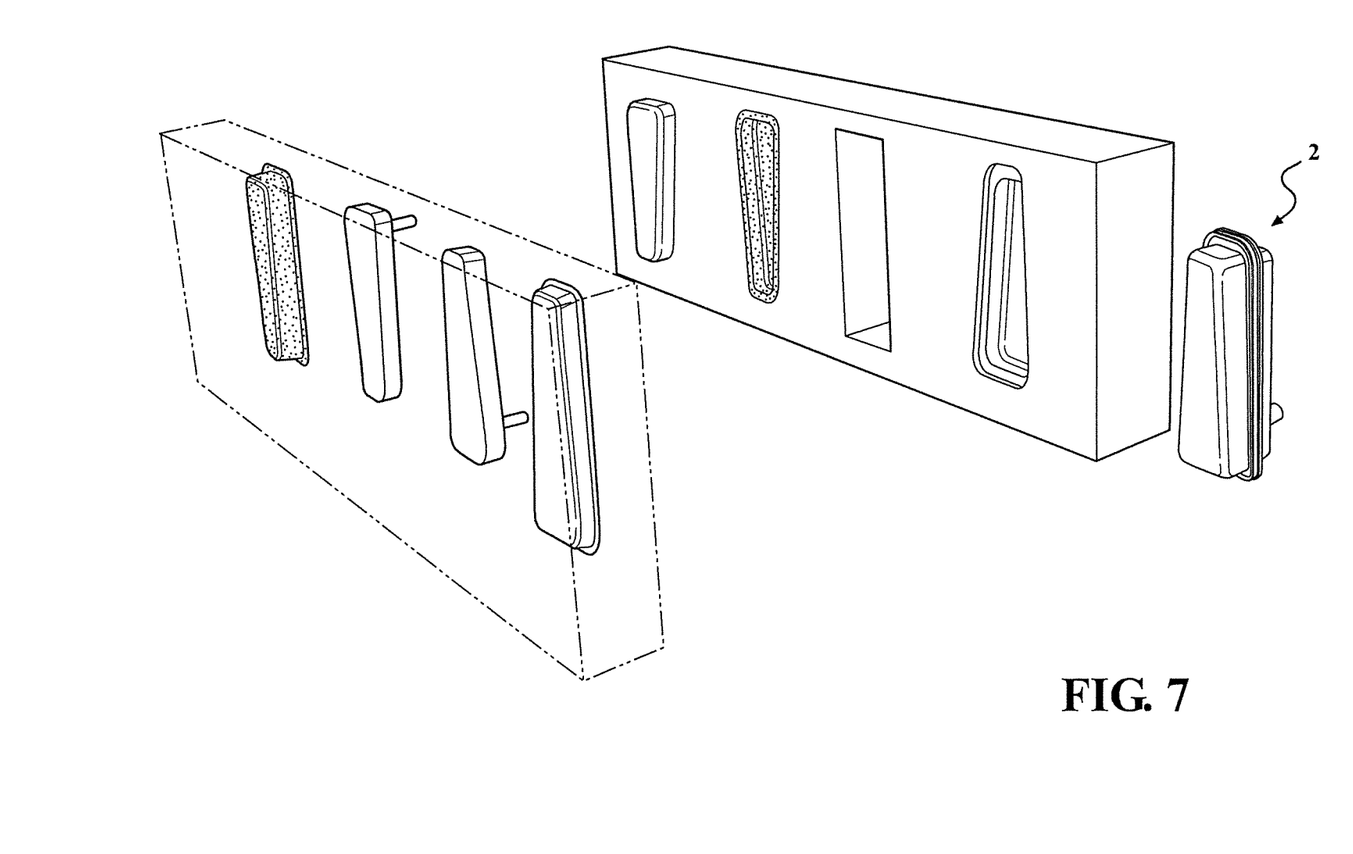
FIG. 7 succeeds FIG. 6 and illustrates a further open mold configuration in which the completed part is removed concurrent with repeating the molding steps of FIGS. 5 and 6.

FIG. 7 succeeds FIG. 6 and illustrates a further open mold configuration in which the completed part 2 is removed, concurrent with the disclosed method repeating the molding steps of FIGS. 5 and 6 for forming a successive part or component. In this fashion, the present mold assembly as depicted in the illustrated embodiment is capable of continuously forming completed parts by contemporaneously completing both first and second injection molding operations within discrete cavity pairs defined in the rotary and stationary mold halve supporting platens. The advantage of this is that a final completed component 2 is produced every successive time the mold opens.

Without limitation, the present inventions contemplate any construction of mold halves not limited to that depicted herein and which can include any number of individual or mating cavity/projection seating or pairing configurations for enabling the initial injection molding formation of the half shells, with successive repositioning/second shot sealing of shells into the hollow sealed article. Beyond that disclosed, it is understood that any arrangement of mold configurations, such as can be employed in the manner illustrated as well as potentially reconfigured within a mass production assembly line process, is contemplated within the present invention.

Along these lines, it is envisioned that the supporting structure for mounting and manipulating the mold halves (e.g. rotary and stationary supporting platens) can likewise be reconfigured as known in the art in order to produce hollow thermoplastic components according to any desired protocol. As also indicated, the configurations of the individual mating molds can be modified through additional manufacturing techniques (such including the swapping either or both of the selected mold halves or pairs) this in order to expand the range of potential parts which can be produced in a production line process. Further envisioned variants could include forming components from any other material not limiting to thermoplastics.

Figure 8:
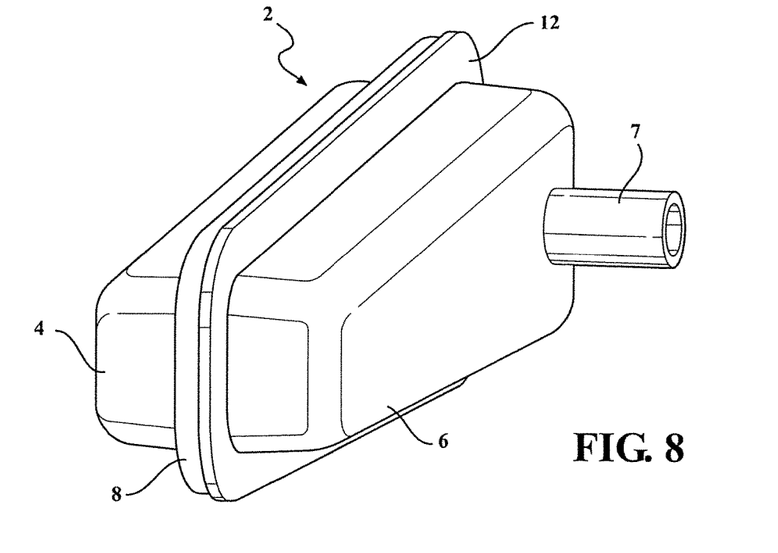
FIG. 8 is an illustration of a completed part, such as represented in FIG. 7, resulting from the dual stage injection molding process and assembly, and showing the manner in which the initially/individually formed mold halves or shells are subsequently sealingly joined and bonded together about their mating perimeters by the second injection molded material.

As previously described, FIG. 8 is an illustration of a completed part, such as represented in FIG. 7, resulting from the dual stage injection molding process and assembly, and showing the manner in which the initially/individually formed mold halves or shells are subsequently joined in a sealing fashion and bonded together about their mating perimeters by the second injection molded material.

Figure 9:
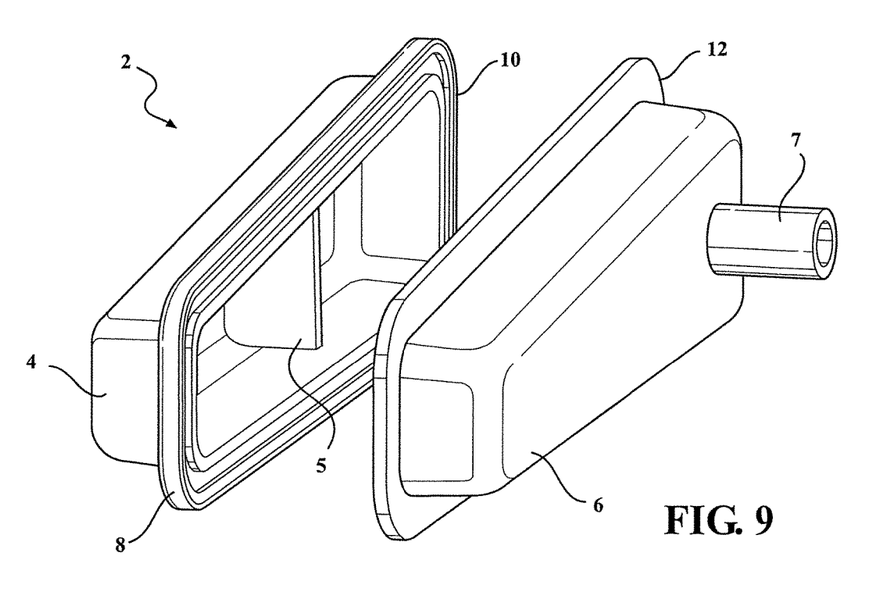
FIG. 9 is an exploded view of the injection molded component and which further depicts the interior of a selected half shell portion illustrative of the range of potential profiles which are made possible by the individual die cavities.

FIG. 9 is an exploded view of the injection molded component and which further depicts the interior of a selected half shell portion illustrative of the range of potential profiles which are made possible by the individual die cavities. FIG. 10 is a rotated and cutaway view of the finished component of FIG. 8 and further illustrating one non-limiting example of a mating profile established between opposing perimeter lip edges associated with the individually formed mold halves/shells, in combination with the second injection shot molded perimeter seal for bonding the mating perimeter edges of the half shells.

Figure 11:
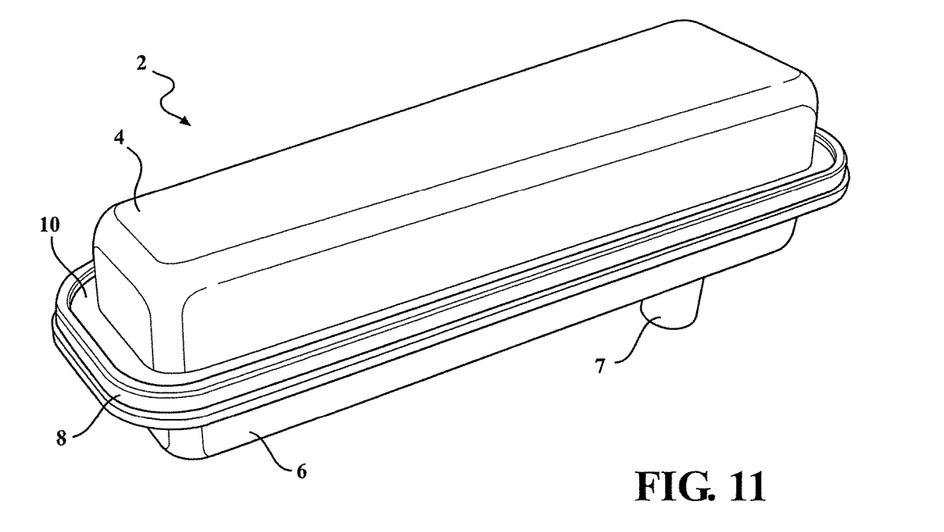
FIG. 11 is a perspective view of the thermoplastic component of FIGS. 8-10 viewed from another angle.
Figure 12:
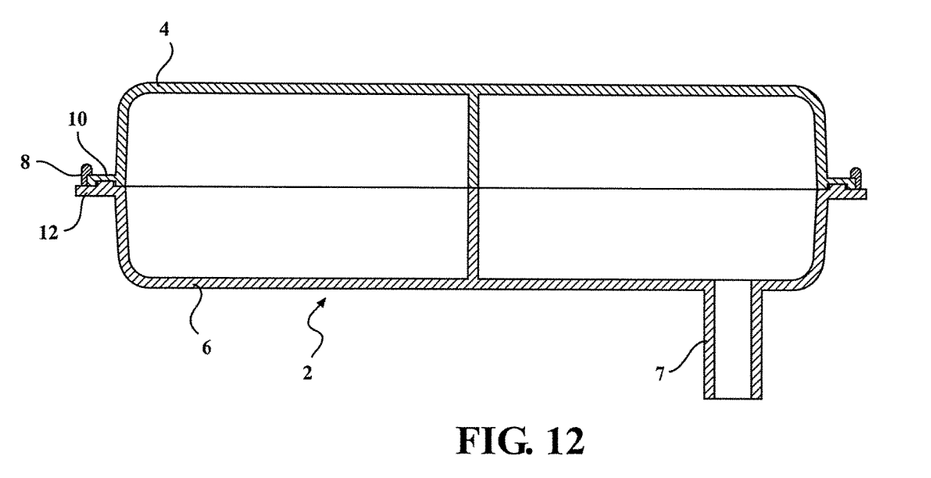
FIG. 12 is a lengthwise cutaway of the component of FIG. 11.
Figure 13:
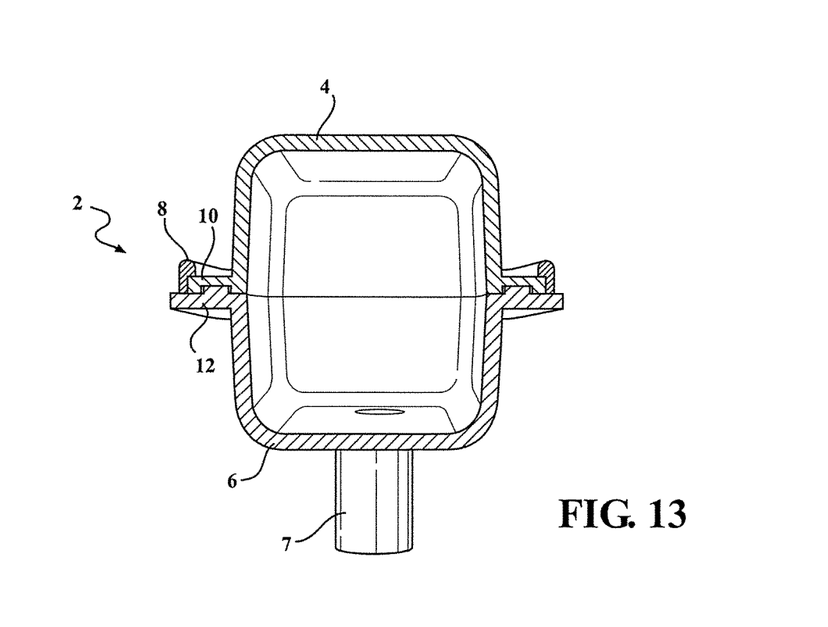
FIG. 13 is an end view cutaway of the component similar to as shown in FIG. 10 and depicting a slightly modified edge defining profile established between the mating lips of the initially formed half shells.
Figure 14:
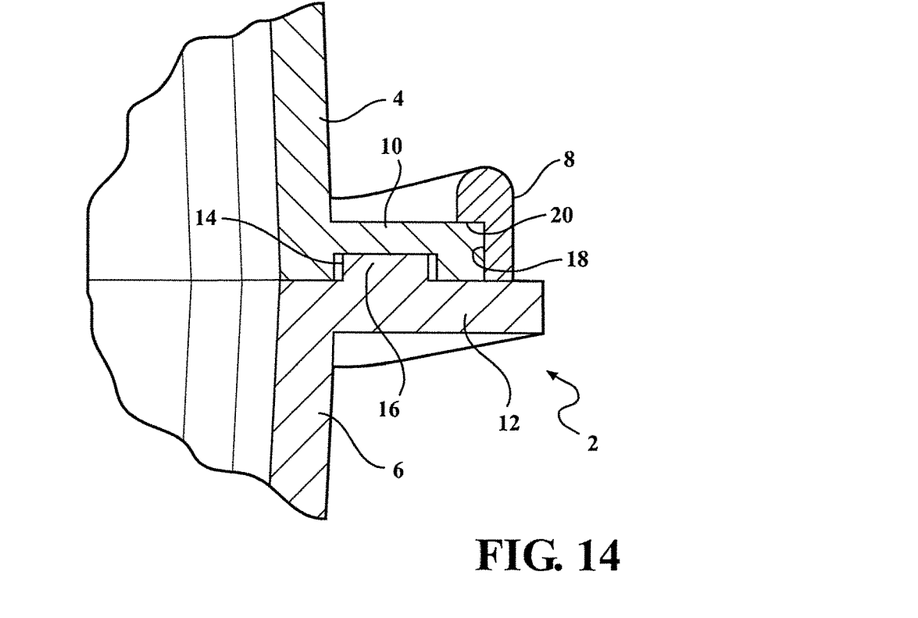
FIG. 14 is an enlarged view of a first selected side extending and mating edge profile of the component in FIG. 13, similar to as depicted in FIG. 10.
Figure 15:
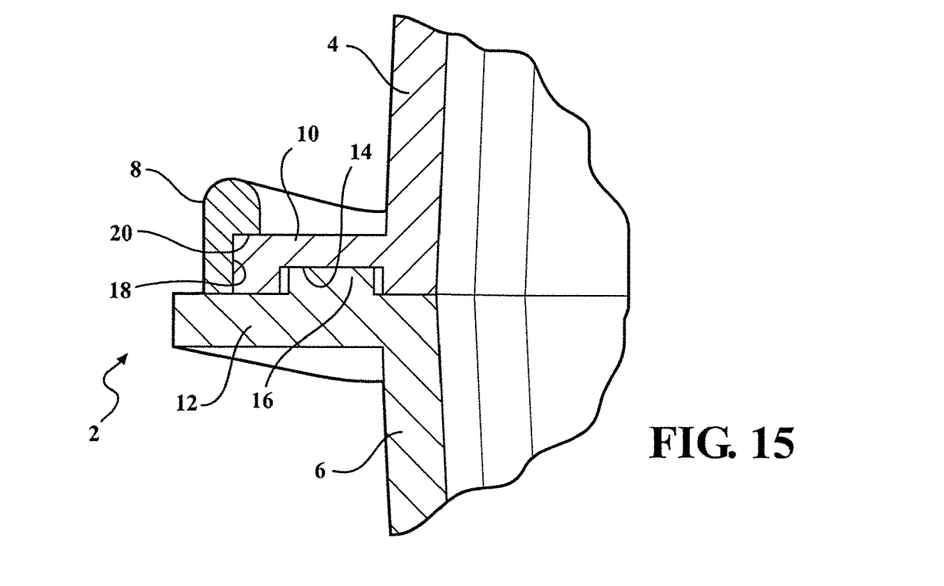
FIG. 15 is a corresponding illustration of the opposite side extending mating edge profile of the component in FIG. 13.

FIG. 11 is a perspective view of the thermoplastic component of FIGS. 8-10 viewed from another angle, with FIG. 12 providing a lengthwise cutaway of the component of FIG. 11. FIG. 13 is an end view cutaway of the component similar to as shown in FIG. 10 and depicting a slightly modified edge defining profile established between the mating lips of the initially formed half shells. FIG. 14 is an enlarged view of a first selected side extending and mating edge profile of the component in FIG. 13, similar to as depicted in FIG. 10 and FIG. 15 is a corresponding illustration of the opposite side extending mating edge profile of the component in FIG. 13.

Consistent with the above description, one non-limiting method of the present inventions for forming a component exhibiting a sealed interior includes each of providing first and second mold halves, and forming first and second half shells of material within cavities defined within each of the mold halves and upon mating the mold halves together in a first closed mold configuration. Subsequent steps include opening and subsequently reorienting at least one of the shells or mold halves such that the first and second half shells are arrayed in opposing fashion with perimeter extending edges of each half shell arranged in contact with one another, reclosing the mold halves and subsequently forming a second perimeter extending material in contact with the contacting perimeter extending edges in order to bond the half shells together and reopening the mold halves and removing a completed component.

Additional steps include rotating the first mold half upon a rotary dies slide platen, as well as employing a pick-and-place mechanism for transferring the second half shell to a further cavity within the second mold half between prior to reclosing the mold halves and forming the perimeter extending material. Also described is the step of configuring multiple configurations within each of the mold halves, the multiple configurations including at least one cavity and one seating projection.

The first and second material forming steps further include providing injection molding operations for introducing a thermoplastic material in flowable form between the mold halves, as well as the step of configuring channels within and between the mold halves in order to deliver the thermoplastic material. Also disclosed is the step of forming the second perimeter extending material so as to exhibit an angled lip edge for bonding overlapping locations associated with the mating edges of the repositioned half shells. Finally, the step of forming the first and second half shells further includes forming the shells in first and second selected pairs of aligning cavity defining configurations established between the mold halves, while concurrently forming the perimeter extending material about a pair of previously formed and reoriented mold shells arranged with a third selected pair of aligning and cavity defining configuration.

Finally, the present invention discloses a mold assembly for forming a component exhibiting a sealed interior, the mold assembly including a stationary supported mold half, a rotary platen supported mold half, with each of the mold halves being movable in directions towards and away from one another in order to define each of engaged/closed and opened/separated positions. Each of the mold halves exhibits a plurality of shell forming locations defined in opposing configured surfaces thereof for forming a first half shell of material in the stationary supported mold half and a second half shell of material in the rotary platen supported mold half and, upon mating the mold halves together in a first closed mold configuration.

Upon separating the mold halves and subsequently rotating the rotary platen supported mold half 180°, in order to reposition the second half shell relative to a further shell forming location associated with the first mold half, the first and second half shells are arrayed in opposing fashion with a perimeter extending and formed edge of each half shell arranged in contact with one another. The mold halves are subsequently reclosed prior to a second perimeter extending material being formed in contact with the contacting perimeter extending edges in order to bond the half shells together. Finally, the mold halves are reopened for removal of a completed component.

The mold assembly also includes a pick-and-place mechanism for transferring the half shell formed in the stationary supported mold half to a further cavity within the stationary supported mold half following formation of the first and second shells and prior to reclosing the mold halves for forming the perimeter extending material. Each of the plurality of shell forming locations may further include cavity and one seating projections. Finally, the mold assembly can incorporate an injection molding operation for introducing a thermoplastic material in flowable form between the mold halves.

Having described our invention, other and additional preferred embodiments will become apparent to those skilled in the art to which it pertains, and without deviating from the scope of the appended claims.

I claim:

1. A method for forming a component exhibiting a sealed interior, comprising the steps of:
   providing first and second mold halves;
   forming first and second half shells of material within cavities defined within each of the mold halves and upon mating the mold halves together in a first closed mold configuration;
   opening and subsequently reorienting at least one of the shells or mold halves such that the first and second half shells are arrayed in opposing fashion with perimeter extending edges of each half shell arranged in contact with one another;
   said steps of opening and reorienting further including each of rotating the first mold half to reposition the first half shell, in combination with employing a pick-and-place mechanism with the second mold half for transferring the second half shell to a further cavity within the second mold half which opposes the first mold half;
   reclosing the mold halves and subsequently forming a second perimeter extending material in contact with the contacting perimeter extending edges in order to bond the half shells together; and
   reopening the mold halves and removing a completed component.

2. The method as described in claim 1, the step of rotating the first mold half further comprising supporting upon a rotary die slide platen.

3. The method as described in claim 1, further comprising the step of configuring multiple configurations within each of the mold halves, the multiple configurations including at least one cavity and one seating projection for creating successive first and second half shells of material in each first closed mold configuration.

4. The method as described in claim 1, the first and second material forming steps further comprising injection molding operations for introducing a thermoplastic material in flowable form between the mold halves.

5. The method as described in claim 4, further comprising the step of configuring channels within and between the mold halves in order to deliver the thermoplastic material.

6. The method as described in claim 1, further comprising the step of forming said second perimeter extending material so as to exhibit an angled lip edge for bonding overlapping locations associated with the mating edges of the repositioned half shells.

7. The method as described in claim 3, the step of forming the first and second half shells further comprising forming the shells in first and second selected pairs of aligning cavity defining configurations established between the mold halves, while concurrently forming the perimeter extending material about a pair of previously formed and reoriented mold shells arranged with a third selected pair of aligning and cavity defining configuration.

\* \* \* \* \*